United States Patent
Schmidt

(10) Patent No.: US 11,864,482 B2
(45) Date of Patent: Jan. 9, 2024

(54) METHOD FOR CONTROLLING THE OPERATION OF AN ATTACHMENT

(71) Applicant: DEERE & COMPANY, Moline, IL (US)

(72) Inventor: Martin Schmidt, Contwig (DE)

(73) Assignee: DEERE & COMPANY, Moline, IL (US)

( * ) Notice: Subject to any disclaimer, the term of this patent is extended or adjusted under 35 U.S.C. 154(b) by 827 days.

(21) Appl. No.: 16/985,428

(22) Filed: Aug. 5, 2020

(65) Prior Publication Data

US 2021/0068332 A1  Mar. 11, 2021

(30) Foreign Application Priority Data

Sep. 10, 2019 (DE) .......................... 102019213746.6

(51) Int. Cl.
| | |
|---|---|
| A01B 69/00 | (2006.01) |
| A01B 63/114 | (2006.01) |
| G05D 1/02 | (2020.01) |
| G06T 7/73 | (2017.01) |
| G06N 3/08 | (2023.01) |

(52) U.S. Cl.
CPC .......... *A01B 69/001* (2013.01); *A01B 63/114* (2013.01); *G05D 1/0212* (2013.01); *G06N 3/08* (2013.01); *G06T 7/73* (2017.01); *G06T 2207/20081* (2013.01); *G06T 2207/20084* (2013.01)

(58) Field of Classification Search
CPC ... A01B 69/001; A01B 63/114; A01B 63/023; A01B 59/066; G05D 1/0212; G06N 3/08; G06T 7/73; G06T 2207/20081; G06T 2207/20084
See application file for complete search history.

(56) References Cited

U.S. PATENT DOCUMENTS

| | | |
|---|---|---|
| 9,555,813 B2 | 1/2017 | Strano |
| 10,306,821 B2 | 6/2019 | Michalke et al. |
| 2002/0157841 A1* | 10/2002 | Bernhardt ............ A01B 69/004 172/7 |
| 2015/0203128 A1* | 7/2015 | Strano ................... B60W 30/02 701/1 |

FOREIGN PATENT DOCUMENTS

| | | |
|---|---|---|
| DE | 2845111 A1 | 4/1980 |
| DE | 102015009889 A1 | 2/2017 |
| EP | 1252806 A2 | 10/2002 |
| EP | 3300558 A1 | 4/2018 |
| WO | WO-2017016670 A1 * | 2/2017 ......... A01B 59/0415 |

OTHER PUBLICATIONS

European Search Report issued in counterpart application No. 20193515.2 dated Feb. 5, 2021 (05 pages).

* cited by examiner

*Primary Examiner* — Abby Y Lin
*Assistant Examiner* — Dylan Brandon Mooney

(57) ABSTRACT

A method for controlling the operation of an attachment includes coupling the attachment to a tractor via a power lift comprising two lower link arms and detecting a pull point as a geometrical intersection of imaginary extensions of both lower link arms based on reference angles. The method further includes determining the reference angles by an optical capture of the lower link arms, and controlling the operation based on the detected pull point.

20 Claims, 2 Drawing Sheets

METHOD FOR CONTROLLING THE OPERATION OF AN ATTACHMENT

RELATED APPLICATIONS

This application claims priority to German Patent Application Ser. No. 102019213746.6, filed Sep. 10, 2019, the disclosure of which is hereby incorporated by reference in its entirety.

FIELD OF THE DISCLOSURE

The present disclosure relates to a method for controlling the operation of an attachment, which is coupled via a power lift to a tractor.

BACKGROUND

A method for avoiding instabilities of a vehicle-trailer combination is known from U.S. Pat. No. 9,555,813. In this method, a yaw angle of the trailer is determined, for example, by a camera, and is compared to a threshold value. A warning signal can be output in dependence on the comparison result to enable an ESP system or the driver to carry out correction measures.

In spite of this, there is a need for enabling an efficient working operation using an attachment in a simple manner.

SUMMARY

In the present disclosure, an attachment is coupled to a tractor via a power lift. The power lift comprises two lower link arms and is designed in particular as a three-point power lift (having one upper link arm and two lower link arms). The control of the operation of the attachment is performed in dependence on an ascertained pull point or in dependence on its ascertained location. The pull point is a geometrical intersection of imaginary extensions of the two lower link arms. It is ascertained in dependence on two reference angles $\alpha$ and $\beta$. These reference angles are each enclosed by an imaginary extension of one lower link arm and a reference straight line. The ascertainment of the reference angles proceeds from the basic concept of capturing the lower link arms, in particular the position or location thereof, by an optical means or device.

In this way, sensors and further technical components for measuring individual physical variables (for example, present length of a lateral stabilizer on the lower link arm) on the power lift can be omitted for the ascertainment of the reference angles—and therefore also for the ascertainment of a present location of the pull point. Rather, only an optical sensor system has to be provided and positioned at a suitable point (for example, on the cab rear side of the tractor) to optically capture the location of a lower link arm or at least one length section of this lower link arm. On the basis of the data of the optical capture, the corresponding reference angles $\alpha$ and $\beta$ may be ascertained using comparatively simple data processing means in a technically simple manner. A cost-effective and simple method for the most accurate possible ascertainment of the pull point is thus provided.

A simple and exact ascertainment of the pull point in turn provides the foundation for efficient optimization of the pull point during the working operation of the attachment, whether by optimization on the part of the driver or user or whether by an automated optimization. The working operation of the attachment becomes more efficient with little technical expenditure due to this optimization of the pull point. This reduces the fuel consumption of the tractor and saves working time. At the same time, a high working quality of the attachment is assisted. Moreover, the optimization of the pull point acts as an assistance function for the driver or user, so that they are significantly relieved before and during the working operation. For example, during the working usage (for example, ploughing, changing ground and topography properties, for example, slope), undesired yawing and correspondingly required steering interventions by the driver can be avoided in that the location of the pull point is optimized. In the case of a different adjustment of the pull point, for example, a defined side draught of the attachment in relation to a furrow wall during ploughing can also be implemented. Overall, higher productivity results with lower operating costs.

The ascertainment of the pull point includes in particular the ascertainment of its location in a defined coordinate system. Its coordinate origin or zero point corresponds to a defined reference point, in particular a center point of the rear axle of the tractor. In this case, an x axis, a y axis, and a z axis intersect in the coordinate origin. The x axis extends in particular in parallel to a longitudinal direction or a vehicle horizontal of the tractor. The y axis extends in particular in parallel to a transverse direction or a vehicle horizontal of the tractor. The z axis extends in particular in parallel to a vertical direction or a vehicle vertical of the tractor. Using this coordinate system, the location of the pull point may be ascertained and defined in a mathematically simple manner using a unique reference point.

A suitable optical sensor system is provided for the optical capture of the lower link arms, for example, at least one camera of arbitrary construction or LiDAR sensors. The optical sensor system is fastened at one point (or distributed at multiple points) of the tractor in such a way that the sensor system has a free view of the lower link arms or at least of sections of the lower link arms.

The optical sensor system is designed in such a way that the lower link arms are optically captured in the form of image data. These data may be processed in a technically simple manner to ascertain the pull point with high accuracy. The image data enable a widely dispersed measuring area and a method which also behaves robustly in terms of data with respect to dust, dirt on the lower link arms, and other interfering factors.

A data processing unit is provided for the processing of the image data, at the output or outputs of which output signals are applied, which represent the ascertained value of the respective reference angle. This data processing unit can be implemented technically simply in a control device of the tractor, which assists a signalling of the ascertained pull point or its optimization.

The data processing unit contains at least one (artificial) neural network, so that the image data can be processed, on the one hand, reliably with high accuracy and, on the other hand, with low technical expenditure. Such artificial neural networks solely require a specific definition phase and a specific learning phase (training) until they supply sufficiently accurate output data. They are used in particular for classification or regression tasks. In this way, neural networks may also advantageously be applied for an analysis of the image data of an optical sensor system and therefore for an ascertainment or computation of the reference angles $\alpha$ and $\beta$.

In one embodiment, a neural network, which receives the image data of the optical sensor system as input signals, is used in the data processing unit. This raw image is classified or segmented in the network. A binary image results in this way as an output signal or output data, in which only the pixels of the lower link arms have a different value than the image pixels outside the lower link arms.

In a further embodiment, the output data of a neural network represent a value of the respective reference angle $\alpha$ or $\beta$. In this way, the network in particular carries out a regression approach for a value-continuous prediction of the respective reference angle. A network having two output neurons can be used for this prediction, which neurons are each assigned to a reference angle $\alpha$ or $\beta$. Alternatively, two networks each having one output neuron for the respective reference angle $\alpha$ or $\beta$ can be provided in parallel for this prediction.

To assist the operational safety and reliability in the ascertainment of the reference angles, the data processing unit comprises an inspection stage, in which output data of the respective network are compared to predefined plausibility data. The plausibility data represent, for example, limiting values of theoretically possible extreme positions of the lower link arms, a geometrical shape of the lower link arms, visibility conditions or environmental conditions of the lower link arms. The plausibility data are in particular a component of corresponding algorithms, using which the output data of the respective network are inspected for the plausibility thereof.

In the case of the above-mentioned binary image as output data of a network, it is checked in a following inspection stage, for example, whether the result appears plausible for the individual lower link arm pixels or for the entirety of all lower link arm pixels. The output signals of the inspection stage then represent a possibly corrected binary image of the respective lower link arm. These output signals can be supplied to a further trained neural network, which predicts the present value of the respective reference angle $\alpha$ or $\beta$ value-continuously via a regression approach.

In the case of a processing of the raw image of the optical sensor system to form a value-continuous prediction of the considered reference angles $\alpha$ and $\beta$ as output data of a neural network, these output data can also be supplied to a following inspection stage. The output signals of the inspection stage then represent possibly corrected values of the respective reference angle $\alpha$, $\beta$.

The reference straight line is in particular a parallel to a longitudinal direction of the tractor. A lower link arm action line having a geometric slope can be ascertained, for example, from the respective reference angle. Using these data, for example, an intersection between the two lower link arm action lines and thus the location of the pull point in a defined coordinate system can be ascertained or computed.

To assist an efficient operation or working usage of the attachment, the ascertained location of the pull point is compared to a target specification. A function signal for automatically triggering a function can be generated in dependence on the comparison result. For example, control signals or adjustment signals can be generated as function signals (for example, via a tractor-side bus system or at hydraulic or electric actuators). These function signals can automatically trigger specific settings on the attachment or tractor (for example, steering system) or its power lift (for example, lower link arms, lateral stabilizers) as functions.

The target specification is generated by the driver (for example, via a user interface) or by a tractor-side control (for example, via a bus system or control unit). During the above-mentioned comparison, a deviation between the present location and the target specification is first ascertained and then the ascertained deviation is compared to a predetermined deviation threshold value. A generation of function signals and thus function triggering (for example, automated adjustment of the pull point) only takes place if, as the comparison result, the ascertained deviation reaches or exceeds the predetermined deviation threshold value.

The pull point can be automatically optimized using the automated function triggering. For optimization of the pull point or its location, for example, the position of a lower link arm is regulated in such a way that the pull point is located on a center longitudinal axis of the tractor.

As already mentioned, an automated adjustment of the pull point or its location is dependent on a comparison of its ascertained location to a target specification. Corresponding function signals can be generated in dependence on the comparison result, which are sent as control signals to actuators. The lower link arms are adjusted by these actuators, whereby an adjustment of the present location of the pull point can be performed. In this case, the lower link arms are adjusted in particular in that a length of a length-variable lateral stabilizer, which is movably coupled to one of the two lower link arms, is adjusted in dependence on the function signal. A hydraulic cylinder of the lateral stabilizer is activated for the required length change by corresponding function or adjustment signals. For the case in which both lower link arms are respectively coupled to one lateral stabilizer, both lateral stabilizers can be activated for the length adjustment.

Alternatively, in an embodiment without a hydraulic cylinder on the lateral stabilizer, the function signal can activate a warning device (which is acoustic or visual in particular), which informs the driver.

If the pull point may not be optimized as desired by a regulation or adjustment of the lower link arm, a function signal can advantageously be generated, which triggers an automatic adjustment of the steering angle of the vehicle steering system by an ascertained angle change. This angle change can be taken into consideration in the case of a driver-free controlled steering system (for example, GPS-controlled steering system) and also in the case of a manual steering system by the driver. In the case of the manual steering system, the ascertained angle change is added to the target steering angle presently set by the driver.

An automatic engagement in the steering system of the tractor to compensate for an undesired yaw torque can therefore be performed using the function signals, so that the desired trajectory can be maintained. This acts as a comfort gain for the driver during the working use.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
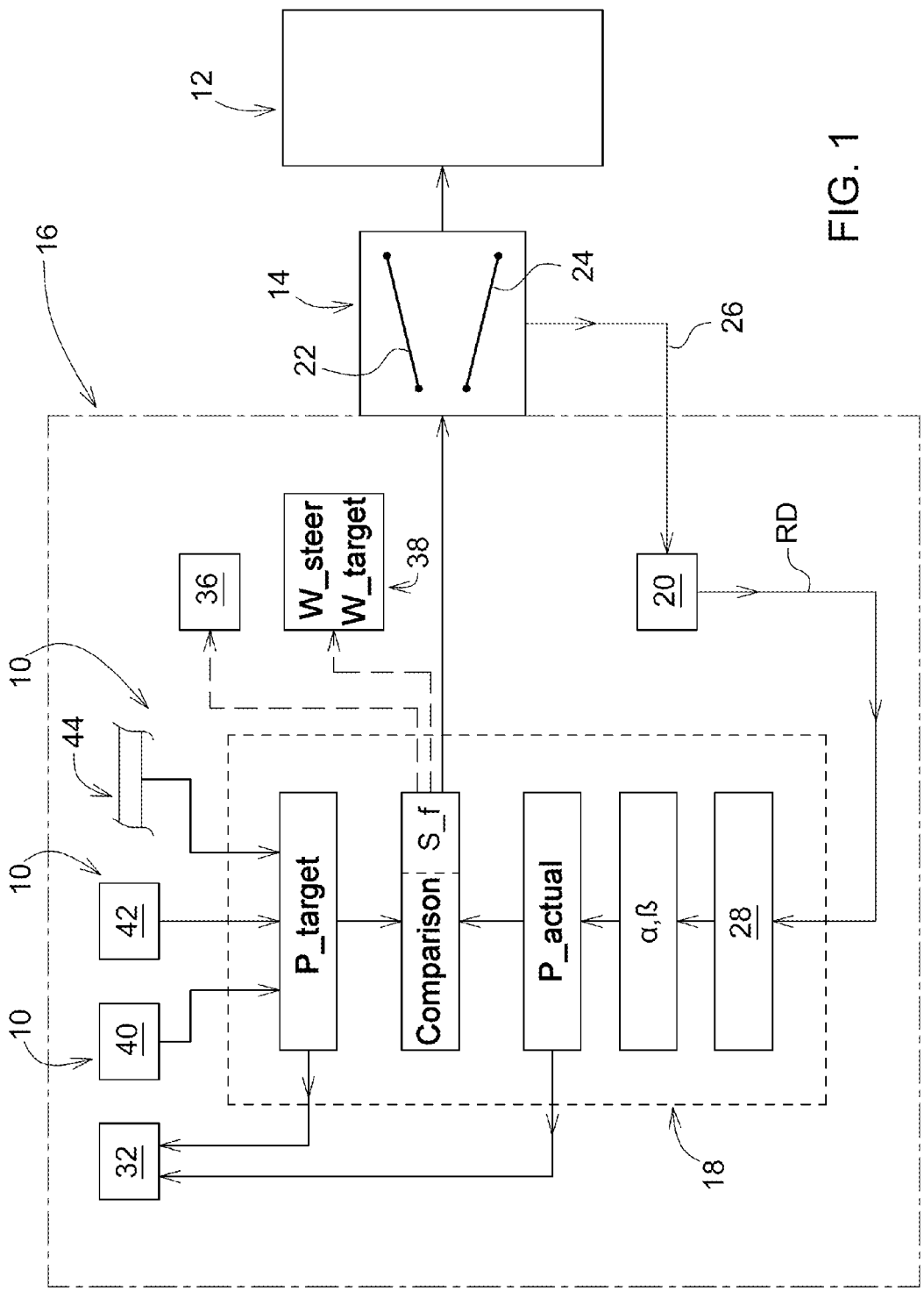
FIG. 1 shows a schematically illustrated arrangement like a block diagram having components for carrying out the method according to the present disclosure.

FIG. 1 shows an arrangement 10 having multiple components for controlling the working operation of an attachment 12. The attachment 12 is coupled via a power lift 14 to a tractor 16. The arrangement 10 is at least partially and in particular completely arranged on the tractor side. It comprises a control unit 18, which contains the subunits required for signal processing, such as read or write unit, storage unit, processor. The control unit 18 can comprise subunits physically separated from one another or can be arranged as a single block on the tractor 16.

The control unit 18 receives sensor signals from an optical sensor system 20 (for example, RGB camera, stereo camera), which is fastened at one (or multiple) suitable position (s) of the tractor 16. These sensor signals can be referred to as image data or raw data RD of one lower link arm 22 or 24 or of the two lower link arms 22, 24 of the power lift 14. The arrow 26 in FIG. 1 indicates that the optical sensor system 20 optically captures the location or position of the respective lower link arm 22, 24.

Figure 2:
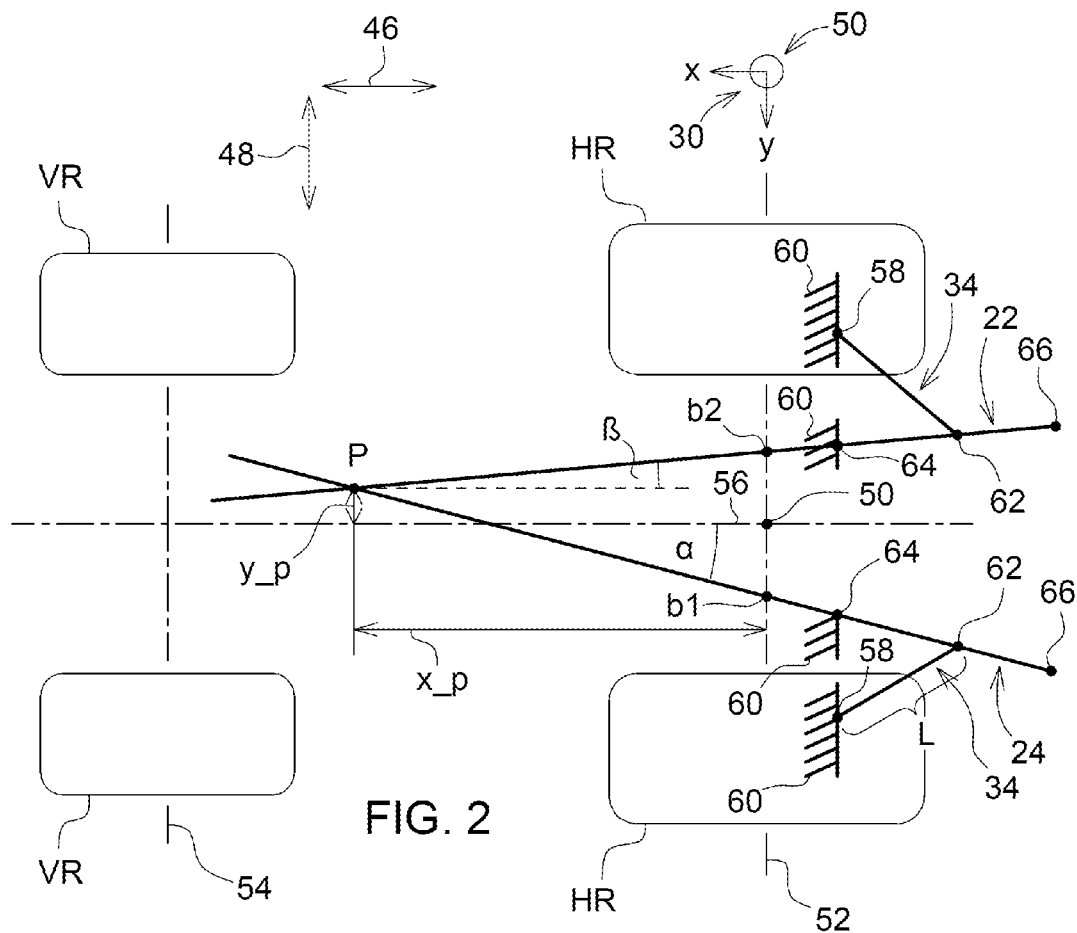
FIG. 2 shows a schematic top view of a tractor having geometrical details for ascertaining the pull point.

A data processing unit 28 inside the control unit 18 ascertains two reference angles α and β to be described hereafter (FIG. 2) from the received raw data RD. From these reference angles α and β, the control unit 18 computes the present location P_actual of a pull point P to be explained hereafter. The present location P_actual is ascertained in the form of coordinates x, y of a defined coordinate system 30 (FIG. 2).

The ascertained location P_actual of the pull point P can be signalled to the driver via a display unit 32 of the tractor 16. Moreover, the ascertained location P_actual of the pull point P can be automatically adjusted in dependence on the result of a comparison to a target specification. The target specification is a target location P_target of the pull point P. The target specification P_target is compared in the scope of an algorithm to the present location P_actual. Function signals S_f, which activate the power lift 14 or its two lower link arms 22, 24 for the adjustment thereof, can be generated in the control unit 18 in dependence on the comparison result. This adjustment of the lower link arms 22, 24 can thus effectuate an automatic implementation of a target specification.

The function signals S_f can be viewed as control signals for triggering a technical function. One such function is the adjustment of the lower link arms 22, 24 to adjust and optimize the location of the pull point P. In this case, a length L of a length-variable lateral stabilizer 34, which is coupled to one of the two lower link arms 22, 24, is adjusted in dependence on the function signal S_f.

A further technical function is the activation of a warning unit 36 on the tractor 16, which informs the driver, in particular visually or acoustically, when the pull point P is supposed to be optimized.

If the desired or computed optimization of the location of the pull point P should not be possible, a further function in the form of an automatic intervention in a steering control unit 38 of the tractor steering system can be triggered by the function signal S_f. In this case, the function signal S_f is taken into consideration, for example, in the computation of the steering angle W_steer of a GPS-controlled steering system or taken into consideration as an angle change to be added on with respect to a target steering angle W_target specified by the driver.

The function triggering with respect to the warning unit 36 and the steering control unit 38 are each possible alternatively or additionally to the adjustment of the lower link arms 22, 24 and are therefore indicated using dashed arrows.

The target specification P_target can be specified, for example, by the driver or user via a user interface 40. Alternatively, the target specification P_target can be automatically defined via a tractor-side control device 42 or a bus system 44 of the tractor 16. The respective target specification P_target can optionally be signalled at the display unit 32. The driver or user can then conveniently recognize target specifications and possibly also change them very precisely via the user interface 40.

A representation of the present location P_actual and the target location P_target on the display unit 22 is similar to the representation in FIG. 2, so that the user has a good overview of the present location and changes of the pull point P.

For the ascertainment of the location of the pull point P, the above-mentioned coordinate system 30 is defined, which is apparent on the basis of FIG. 2. The coordinate system 30 comprises an x axis and a y axis. The x axis extends in parallel to a longitudinal direction 46 of the tractor 16, in particular a vehicle horizontal. The y axis extends in parallel to a transverse direction 48 of the tractor 16, in particular a further vehicle horizontal. The two mentioned axes intersect in a coordinate origin 50 or zero point, which corresponds to a reference point for the location of the pull point P. As is apparent in FIG. 2, this reference point corresponds to a center point of a rear axle 52 of the tractor 16.

Furthermore, it can be inferred from FIG. 2 that during the working usage shown therein, the location of the pull point P is located along the longitudinal direction 46 between the rear axle 52 having two rear wheels HR and a front axle 54 having two front wheels VR of the tractor 16.

The pull point P is the geometrical intersection of imaginary extensions of the two lower link arms 22, 24 (FIG. 2). It is to be explained on the basis of FIG. 2 how the pull point P can be ascertained with little technical effort in dependence on two reference angles α, β. In this case, an imaginary extension of the respective lower link arm 22, 24 and a reference straight line 56 extending in parallel to the longitudinal direction 46 form the angle legs of these reference angles α, β.

For the sake of completeness, it is to be noted that a length-variable lateral stabilizer 34 is associated with each lower link arm 22, 24 in FIG. 2. The length change is performed by a corresponding activation of a hydraulic cylinder (not shown here). The lateral stabilizer 34 is movably coupled to a coupling point 58, which faces toward the tractor 16, on a support structure 60 of the tractor 16. The lateral stabilizer 34 is articulated with the lower link arm 22 via a linkage point 62 opposing the coupling point 58. This linkage point 62 is located between a coupling point 64, which faces toward the tractor 16, and a coupling point 66, which faces toward the attachment 12, of the lower link arm 22. This construction setup also applies similarly for the second lower link arm 24.

If the values of the reference angles α, β are known, the distances b1 and b2, which originate from the coordinate origin 50 and extend along the transverse direction 48, to the imaginary extensions of the lower link arms 22, 24 can also be computed. The x coordinate x_p and the y coordinate y_p of the pull point P result from the reference angles α, β and the distances b1, b2 as follows:

$$x\_p = (b2-b1)/(\tan \alpha - \tan \beta), \text{ and}$$

$$y\_p = (\tan \alpha - x\_p) + b1.$$

As already mentioned, the ascertainment of the reference angles α, β is performed by the data processing unit 28. It is therefore possible to omit conventional measurements on the power lift 14, such as length measurements on the lateral stabilizer 34 by suitable measuring systems.

Figure 3:
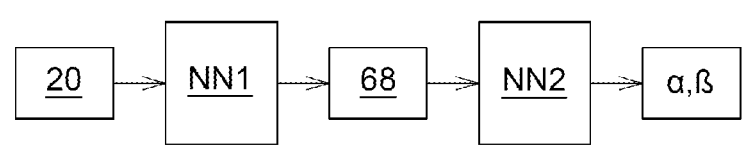
FIG. 3 shows a schematically illustrated data processing unit in a first embodiment for processing image data of the lower link arms.

An embodiment of the data processing unit 28 is illustrated in FIG. 3. The image data of the sensor system 20 are supplied to a neural network NN1. The input signals of the network NN1 thus represent the raw image of one lower link arm or both lower link arms 22, 24. The output signals of this network NN1 represent a classified binary image of the optically captured lower link arms 22, 24. In other words, one value is assigned to the lower link arm pixels, while all other image pixels outside the lower link arms 22, 24 have another value. The output signals or output data of the network NN1 are compared in an inspection stage 68 to predefined plausibility data. The output data of the inspection stage 68 therefore represent a possibly corrected binary image of the lower link arms 22, 24. The values of the reference angles α and β are derived in a further neural network NN2 on the basis of the possibly corrected binary image. For the case in which only one reference angle α or β is derived in the network NN2, still a further neural network is provided at the inspection stage 68 for deriving the second reference angle.

Figure 4:
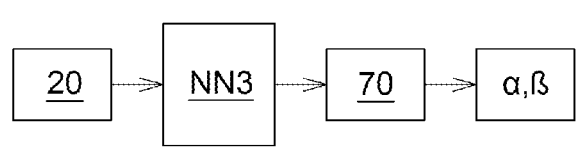
FIG. 4 shows a schematically illustrated data processing unit in a second embodiment for processing image data of the lower link arms.

FIG. 4 shows a further embodiment of the data processing unit 28. The optical sensor system 20 sends the image data or the raw image to a neural network NN3 here. This network NN3 has two output neurons having linear activation function. The regression approach used in the network NN3 results in a value-continuous prediction of the two considered reference angles α and β In a following inspection stage 70, an inspection of the predicted reference angle values for the plausibility thereof is performed by suitable predefined plausibility data. The output data of the inspection stage 70 represent possibly corrected values of the reference angles α and β.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling the operation of an attachment, comprising:
    coupling the attachment to a tractor via a power lift comprising two lower link arms;
    detecting a pull point as a geometrical intersection of imaginary extensions of both lower link arms based on reference angles, where the imaginary extensions of the lower link arms enclose with a reference straight line;
    determining the reference angles by an optical capture of the lower link arms; and
    controlling the operation based on the detected pull point.

2. The method according to claim 1, further comprising performing the optical capture in the form of image data.

3. The method according to claim 2, further comprising processing the image data in a data processing unit, the output signals of which represent the reference angles.

4. The method according to claim 3, wherein the image processing unit contains at least one neural network for processing the image data.

5. The method according to claim 4, wherein output data of a neural network represents a classified binary image of the image data.

6. The method according to claim 4, wherein output data of a neural network represents a value of the respective reference angle.

7. The method according to claim 5, further comprising comparing output data of a neural network in an inspection stage of the data processing unit to predefined plausibility data.

8. The method according to claim 6, further comprising comparing output data of a neural network in an inspection stage of the data processing unit to predefined plausibility data.

9. The method according to claim 5, wherein the reference straight line extends in parallel to a longitudinal direction of the tractor.

10. The method according to claim 1, further comprising comparing the detected pull point to a target specification.

11. The method according to claim 10, further comprising generating a function signal for triggering a function in dependence on a result of the comparing step.

12. The method according to claim 11, further comprising adjusting a length of a length-variable lateral stabilizer in dependence on the function signal, where the length-variable lateral stabilizer is coupled to one of the two lower link arms.

13. The method according to claim 11, further comprising adjusting a steering angle of a tractor steering system in dependence on the function signal.

14. A method for controlling the operation of an attachment, comprising:
    coupling the attachment to a tractor via a power lift comprising two lower link arms;
    detecting a pull point as a geometrical intersection of imaginary extensions of both lower link arms based on reference angles, where the imaginary extensions of the lower link arms enclose with a reference straight line;
    determining the reference angles by an optical capture of the lower link arms;
    controlling the operation based on the detected pull point;
    comparing the detected pull point to a target specification; and
    generating a function signal for triggering a function in dependence on a result of the comparing step.

15. The method according to claim 14, further comprising adjusting a length of a length-variable lateral stabilizer in dependence on the function signal, where the length-variable lateral stabilizer is coupled to one of the two lower link arms.

16. The method according to claim 14, further comprising adjusting a steering angle of a tractor steering system in dependence on the function signal.

17. The method according to claim 14, further comprising performing the optical capture in the form of image data.

18. The method according to claim 17, further comprising:
- processing the image data in a data processing unit, the output signals of which represent the reference angles; and
- providing the image processing unit with at least one neural network for processing the image data.

19. A method for controlling the operation of an attachment, comprising:
- coupling the attachment to a tractor via a power lift comprising two lower link arms;
- detecting a pull point as a geometrical intersection of imaginary extensions of both lower link arms based on reference angles, where the imaginary extensions of the lower link arms enclose with a reference straight line;
- determining the reference angles by an optical capture of the lower link arms;
- controlling the operation based on the detected pull point;
- processing the image data in a data processing unit, the output signals of which represent the reference angles; and
- providing the image processing unit with at least one neural network for processing the image data;
- wherein output data of a neural network represents a classified binary image of the image data or a value of the respective reference angle.

20. The method according to claim 19, further comprising comparing output data of a neural network in an inspection stage of the data processing unit to predefined plausibility data.

* * * * *